United States Patent [19]

Delzant

[11] Patent Number: 4,547,233
[45] Date of Patent: Oct. 15, 1985

[54] GAS-FILLED GLASS BEADS AND METHOD OF MAKING

[75] Inventor: Marcel Delzant, Charleroi, Belgium

[73] Assignee: Glaverbel, Brussels, Belgium

[21] Appl. No.: 610,089

[22] Filed: May 9, 1984

[30] Foreign Application Priority Data

May 13, 1983 [GB] United Kingdom ............... 8313291

[51] Int. Cl.⁴ ..................... C06B 45/00; C03B 19/10
[52] U.S. Cl. ......................................... 149/2; 65/21.4; 65/22; 65/31; 501/33
[58] Field of Search ................... 65/21.4, 22, 31; 264/14, 43; 149/2; 501/33

[56] References Cited

U.S. PATENT DOCUMENTS

| 2,500,801 | 3/1950 | Church | 65/31 X |
| 3,116,991 | 1/1964 | le Clerc | 65/31 |
| 4,063,916 | 12/1977 | De Vos | 65/21.4 |
| 4,097,258 | 6/1978 | Horikawa et al. | 65/31 |

FOREIGN PATENT DOCUMENTS

| 2370015 | 6/1978 | France. |
| 2463110 | 2/1981 | France. |
| 1593163 | 7/1981 | United Kingdom. |
| 812780 | 3/1981 | U.S.S.R. ............... 65/21.4 |

OTHER PUBLICATIONS

"Production of Hollow Glass Microspheres for Laser Fusion Targets", The Glass Industry, Oct. 1981, V. F. Draper.

Primary Examiner—Robert Lindsay
Attorney, Agent, or Firm—Spencer & Frank

[57] ABSTRACT

A method of producing gas filled hollow glass beads comprises the steps of:
i. manufacturing hollow glass beads having an alkali content of at least 20% calculated as weight per cent of oxide in the bead,
ii. exposing the beads to an acidic treatment medium, for example HCl, HNO₃, H₂SO₄, SO₂, SO₃, to reduce the alkali content of the beads to not more than 15%, and
iii. causing gas to diffuse into the beads.

15 Claims, No Drawings

GAS-FILLED GLASS BEADS AND METHOD OF MAKING

BACKGROUND OF THE INVENTION

This invention relates to a method of producing gas-filled hollow glass beads.

A particular use for gas-filled hollow glass spheres is as fillers for emulsion-type explosive compositions for example as set out in British Patent Specification Nos. 1 593 163 (Atlas Powder Company) and 2 055 358 (E. I. Du Pont De Nemours and Company), corresponding respectively to French Pat. Nos. 2 370 015 and 2 463 110.

For example, the Atlas Powder specification discloses a cap-sensitive explosive composition consisting of from 3 to 10% by weight of carbonaceous fuel including an emulsifier, a discontinuous aqueous oxidiser solution phase of from 10 to 25% by weight water and from 35 to 86% by weight inorganic oxidising salts composed principally of ammonium nitrate and closed cell void containing materials sufficient to yield a density of the emulsion explosion composition in the range of from about 1.1 to 1.3 g/cc. It is stated that the preferred closed cell void containing materials for use in this way are glass beads having a size in the range 10 to 175 $\mu$m and a bulk density in the range 0.1 to 0.4 g/cc which can constitute 1 to 10% by weight of the explosive mixture. It is implicit in this that the glass beads may be present in amounts exceeding 40% of the total volume of the mixture. The incorporation of such glass beads in the explosive emulsion enables the formulation of a composition which is sensitive to a conventional No. 6 electric blasting cap without sensitizing it to detonation by fire, bullet, impact, friction or static electricity.

Hollow glass beads having a size and density within these ranges may readily be formed by spraying an aqueous solution or suspension of glass-formers so that droplets of the solution travel through a firing zone at glass forming temperature. Cellulation of the beads is then caused by evaporation of water within each droplet after an exterior skin has been formed by the firing. If desired a substance such as urea which will evolve gas at the firing temperature may be added to the solution. Specific examples of such a process are described in British Patent Specification No. 1 568 817 (Sovitec S. A.) and counterpart U.S. Pat. No. 4,063,916.

When glass beads are formed in this way, they have certain properties which could be improved upon for the purpose in view.

In particular, the beads, being largely formed from soluble glass-formers, are liable to attack by hydrolysis. Thus they will age when incorporated in a water-in-oil emulsion so limiting the storage life of the explosive.

Furthermore, the gas pressure within the hollow glass beads on cooling after manufacture is typically about 0.3 to 0.4 bar and this low pressure tends to act as a brake on the speed of detonation of an explosive in which they are incorporated.

SUMMARY OF THE INVENTION

It is an object of the invention to provide a method of producing gas-filled hollow glass beads which have improved properties for incorporation into emulsion type explosives.

According to the present invention, there is provided a method of producing gas-filled hollow glass beads comprising the steps of manufacturing hollow glass beads having an alkali content of at least 20% calculated as weight % of oxide in the bead, exposing the beads to an acidic treatment medium to reduce the alkali content of the beads to not more than 15%, and causing gas to diffuse into the beads.

Glass beads produced in accordance with the invention have highly desirable properties for incorporation into emulsion-type explosives. The use of gas-filled beads enables the formulation of an emulsion which can be caused to detonate consistently and in a reliable manner. Because the alkali content of the beads is not more than 15% by weight, they are resistant to hydrolytic attack so that this consistency and reliability is maintained over a useful storage life.

DESCRIPTION OF THE PREFERRED EMBODIMENTS

It is stated in British Patent Specification No. 2 055 358 referred to hereinbefore that it is undesirable to incorporate more than 50% by volume of gas bubbles or voids into the emulsion inasmuch as low explosive performance may result. This reduction in explosive performance is alleviated by causing gas to diffuse into the glass beads so that their internal gas pressure is higher than would otherwise be the case.

Said gas is preferably caused to diffuse into the beads so that the mean gas pressure within them is at least 0.8 bar for example to a pressure of about 1.0 bar.

Said gas caused to diffuse into the beads advantageously comprises one or more of nitrogen, krypton, argon and helium. For example air may be used. The gaseous elements cited are chosen in view of their low solubility in water and in view of their rates of diffusion. Of these four gases nitrogen is the most preferred in view of its low cost.

For causing said diffusion, the beads are advantageously placed in an environment at a temperature in the range 200° to 550° C. and a pressure of at least 5 bar. The mobility of the gas molecules will clearly increase with temperature, but it is to be noted that the beads should not be subjected to such a high temperature that they become softened so that they collapse when subjected to high pressure. It has been found that operating in the said temperature range gives a favourable compromise as to high molecular mobility and low risk of collapse of the beads. Operating in an environment at high pressure increases the net rate of diffusion of gas into the beads. By way of example, hollow glass beads having a size range of 10 to 250 $\mu$m and a bulk density of 0.1 to 0.3 kg/L have been treated in an autoclave maintained at 400° C. and charged with nitrogen at 10 bar. At the end of one hour the internal gas pressure in the beads was found to be about 1 bar.

Said diffusion preferably takes place substantially in the absence of $H_2O$ in order to minimise the amount of water vapour which is caused to diffuse into the beads. This is especially important when such diffusion takes place at above the boiling point of water.

Advantageously, the acidic treatment medium used to reduce the alkali content of the beads is selected from HCl, $HNO_3$, $H_2SO_4$, $SO_2$ and $SO_3$. The use of hydrochloric acid is particularly preferred. The use of one of these acids gives advantages in allowing rapid dealkalisation without high risk that well-formed beads will be destroyed by the treatment.

Such risk of destruction of well-formed beads is alleviated when at the commencement of reduction of bead alkali content, the acidic treatment medium is an aqueous solution having a pH of at least 2.5 as is preferred.

In some preferred embodiments of the invention, the hollow glass beads are subjected to a polishing treatment, for example, and preferably the beads are treated with a polishing solution containing an organic acid selected from beta-hydroxy acids, oxalic acid and ethylene diamine tetraacetic acid and/or a salt of a said organic acid. Such polishing removes surface defects from the glass so that the removed defects are no longer available as stress raisers. Thus when comparing hollow glass beads of the same wall thickness a polished bead will have a better mechanical resistance than an unpolished bead. This is important when gas is diffused into the beads from a high pressure environment and also when mixing the beads into, for example a water-in-oil emulsion type explosive. Furthermore, because the beads are chemically polished, their walls will be thinner thus contributing to a reduction in the bulk density of the beads which can also present important advantages in practice. A further advantage of chemically polishing hollow glass beads in this way is that a high proportion of any defective beads present can be eliminated. It happens in the production of hollow glass beads that a portion of the beads produced will not be well formed in that their walls may be incomplete or too thin in places. A chemical polishing treatment can be performed so that too-thin wall portions are dissolved. Thus defective beads can be gravity separated in a flotation tank. Such a chemical polishing treatment forms the subject of copending application No. 82 26 106 (Publication GB No. 2.127.009A).

Beta-hydroxy acids particularly in view for such a polishing treatment are, in increasing order of preference, malic acid, tartaric acid, gluconic acid and citric acid. It will be noted that in addition to being beta-hydroxy acids, these are also alpha-hydroxy acids as is preferred. Particular preference is given to the use of a solution containing citric acid or a citrate.

When an organic acid salt is used, it is preferred to use a sodium salt.

Advantageously, at the beginning of said polishing treatment the solution has a pH of at least 5 and preferably in the range 7 to 10 inclusive. This allows good control of the rate at which the reactions take place, and, at least when starting at the lower end of such limited pH scale, also promotes dealkalising of the surface of the beads.

A said dealkalising acid treatment can precede or follow treatment with the polishing solution containing the organic acid or salt referred to above, but it is more convenient in practice for such dealkalising acid treatment and such polishing treatment to take place during overlapping time periods as is preferred. The use of a said organic acid or salt in combination with an inorganic acid is particularly important since it enables significant quantities of sodium ions to be leached from the surfaces of the glass beads. The dealkalising treatment preferably commences before the polishing treatment.

In the most preferred embodiment of the invention, said beads are, after the acid treatment, contacted by an organo-silane. Such a silanisation of the beads gives advantages inter alia in passivating their surfaces.

The said diffusion of gas may take place before or after such a silanisation of the beads.

The invention includes glass beads produced by a method as herein defined and extends to an emulsion-type explosive composition which incorporates such beads.

The following is a particular example of a process according to the invention.

EXAMPLE

In order to produce hollow vitreous beads, solutions of various starter materials were formed into a slip which contained:
sodium silicate: 100 parts by weight
calcium hydroxide: 2.64 parts by weight
sodium carbonate: 3.41 parts by weight
water to a viscosity of 2300 cP, and urea.

The slip was sprayed as droplets less than 500 μm in size into a combustion chamber in which they were converted into hollow vitreous beads.

The glass beads produced had the following approximate composition by weight: $SiO_2$ 70%; $Na_2O$ 25%; CaO 5%. These beads were treated in accordance with the present invention. The beads produced were mostly below 125 μm in diameter, the average diameter being in the range 60 to 70 μm. Well-formed beads had a wall thickness of the order of 1 to 3 μm, and the average density of the beads was 0.35 kg/L.

A solution for treating 1 $m^3$ of such beads was made up by mixing 100 L concentrated hydrochloric acid with 900 L water and dissolving 20 kg of citric acid. The pH of the solution thus obtained was close to 0. The solution was heated to 80° C. in a bath and the beads were introduced into the solution and were continuously agitated for a period of 15 minutes after which the pH was about 7. At the end of that period, the beads were removed from the treatment solution and transferred to a flotation tank containing water, where a high proportion of malformed beads sank. The floating beads were then skimmed off. The malformed beads sank because their walls had either not been properly formed in the first place or because their walls were too thin to withstand the corrosive effect of the citric acid.

At the end of the treatment the well-formed beads had a typical density of 0.28 kg/L and the alkali content of the beads, calculated as weight percent sodium oxide, had been reduced from 25% to 13%.

Hollow glass beads produced in this way are found to contain gas, which is largely carbon dioxide, to a pressure of about one third atmospheric.

Following this dealkalising and polishing treatment, the glass beads were introduced into an autoclave which was heated to 400° C. to dry the beads. The interior of the autoclave was flushed to remove $H_2O$ and connected to a source of nitrogen at 10 bar pressure. After one hour, the beads were removed and it was found that their cells were charged with gas to a pressure of about 1 bar.

Such hollow glass beads can be incorporated as the glass microbubble or glass microballoon constituent of the explosive compositions described in the Examples of British Patent Specification Nos. 1 593 163 and 2 055 358A respectively.

In a variant of this Example, the citric acid was omitted from the treatment solution. An aqueous solution of hydrochloric acid was made up to a pH of about 3.0 for treating beads having a bulk settled density of 0.3 T/$m^3$. At the end of the treatment, the solution had a pH of about 7.0 and the alkali content of the beads had been reduced from 25% to 13% without substantially affecting their bulk settled density.

The beads were then further processed as before.

In another variant of this example, glass beads having the approximate composition by weight: $SiO_2$ 68%; $B_2O_3$ 7%; $Na_2O$ 25% and an actual average density of 0.32 kg/l were treated in a similar manner with the aqueous solution of hydrochloric acid and citric acid.

At the end of the treatment the well-formed beads had an actual average density of about 0.28 kg/l and the alkali content of the beads, calculated as weight percent sodium oxide was about 13%.

The beads were then further processed as before.

I claim:

1. A method of producing gas-filled hollow glass beads comprising the steps of manufacturing hollow glass beads having an alkali content of at least 20% calculated as weight % of oxide in the bead, contacting the beads with an acidic treatment medium to reduce the alkali content of the beads to not more than 15%, and causing nonhydrogen gas to diffuse into the beads after manufacture thereof by exposing said beads to said gas at a pressure greater than one atmosphere.

2. A method according to claim 1, wherein the gas caused to diffuse into the beads is at least one of nitrogen, krypton, argon and helium.

3. A method according to claim 1, wherein said step of causing gas to diffuse comprises placing the beads in an environment at a temperature in the range 200° to 550° C. and a pressure of at least 5 bar.

4. A method according to claim 1 wherein said diffusion takes place substantially in the absence of $H_2O$.

5. A method according to claim 1 wherein said acidic treatment medium is selected from among HCl, $HNO_3$, $H_2SO_4$, $SO_2$ and $SO_3$.

6. A method according to claim 1 wherein at the commencement of reduction of bead alkali during said step of contacting, the acidic treatment medium is an aqueous solution having a pH of at least 2.5.

7. A method according to claim 1 further comprising treating the beads with a polishing solution containing an organic acid selected from among beta-hydroxy acids, oxalic acid and ethylene diamine tetracetic acid and/or a salt of a said organic acid.

8. A method according to claim 7 wherein the organic acid is a beta-hydroxy acid which is also an alpha-hydroxy acid.

9. A method according to claim 7 wherein at the beginning of said treating step, said solution has a pH of at least 5 and preferably in the range 7 to 10 inclusive.

10. A method according to claim 7 wherein said steps of contacting and treating take place during overlapping time periods.

11. A method according to claim 1 further comprising, after said contacting step, bringing said beads in contact with an organo-silane.

12. Glass beads produced by the method according to claim 1.

13. An emulsion-type explosive composition incorporating glass beads according to claim 12.

14. A method according to claim 1, wherein said step of causing gas to diffuse is conducted so that said beads are charged with said gas to pressure of at least about one bar.

15. A method according to claim 1, wherein the gas caused to diffuse into the beads is at least one of nitrogen, krypton, argon and helium, and wherein said step of causing gas to diffuse comprises placing the beads in an environment at a temperature in the range 200° to 550° and a pressure of at least 5 bar.

* * * * *